June 19, 1962 L. A. UMBACH 3,039,375
SHUTTER SYNCHRONIZED TRIGGERING APPARATUS FOR
HIGH SPEED PHOTOGRAPHIC LIGHT UNITS
Filed Feb. 24, 1959 2 Sheets-Sheet 1
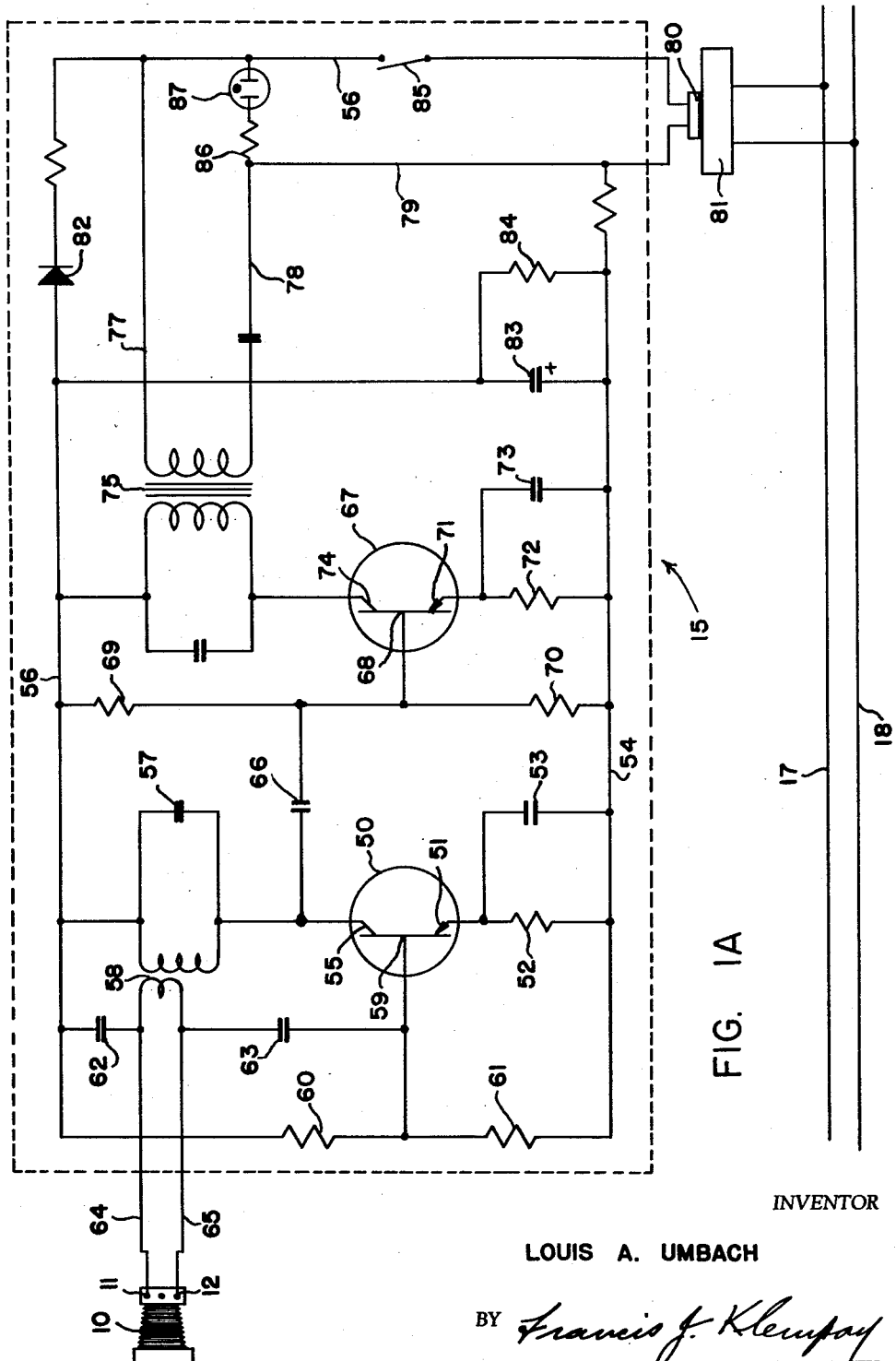
FIG. IA
INVENTOR
LOUIS A. UMBACH
BY *Francis J. Klempay*
ATTORNEY

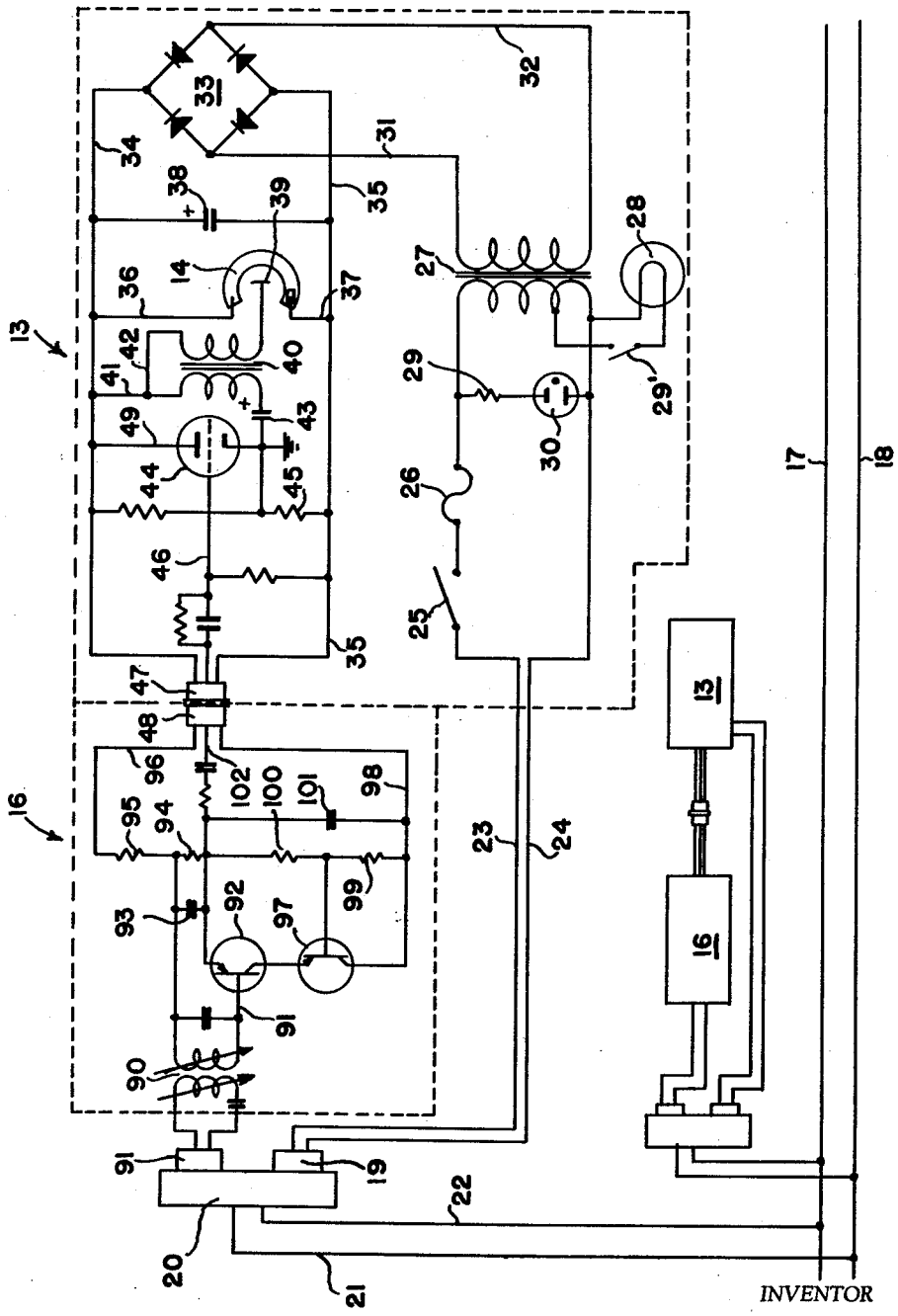

United States Patent Office 3,039,375
Patented June 19, 1962

3,039,375
SHUTTER SYNCHRONIZED TRIGGERING APPARATUS FOR HIGH SPEED PHOTOGRAPHIC LIGHT UNITS
Louis A. Umbach, Youngstown, Ohio, assignor to The Photogenic Machine Company, Youngstown, Ohio, a corporation of Ohio
Filed Feb. 24, 1959, Ser. No. 795,044
5 Claims. (Cl. 95—11.5)

The present invention relates generally to the art of photography and more particularly to shutter synchronized triggering apparatus for high speed photographic light units.

As will be understood by those skilled in this art, high speed photographic light units each have their own power source and are now widely employed in photographic studios. Such light units are used to provide a high level of effective illumination for a very short period of time—a few thousandths of a second, for example—to illuminate the subject during the exposure of a light sensitive photographic negative. In order to properly illuminate the subject a photographic studio will normally employ a plurality of light units and, since their period of illumination is extremely short, it is necessary to provide apparatus to simultaneously trigger the individual light units in synchronism with the opening of the shutter of the photographic camera.

The above problem has long been recognized in the art and many systems have been advanced for synchronizing the flash of the light units. For example, U.S. Patent No. 2,408,764 to Edgerton discloses the use of photoelectric cells for this purpose. Although such apparatus is now widely employed, it is not entirely satisfactory in that the employment and utilization of the light units are unduly restricted. The possibility always exists that someone will step in front of or otherwise block the photoelectric cells from their light sources just as the shutter of the camera is opened. When this occurs one or more of the light units will not fire thereby resulting in an unacceptable exposure. Also, the photoelectric cells must be placed in line of sight with respect to their light sources and this restricts the movement and placement of the light units.

Radio transmitting and receiving apparatus has been suggested for this purpose but is not now widely employed because of the prohibitive cost and bulk thereof and also because such apparatus is unstable and subject to excitation by stray and random radiations present in the photographic studio. The use of conductors and trip cords running from the shutter contacts of the camera to the individual light units has been utilized but such an arrangement is objectionable in that the multiple conduits are unsightly and present a serious safety hazard and restrict movement of the light units.

It will thus be seen that there is need for an improved shutter synchronized triggering apparatus for high speed photographic light units and it is the prime or ultimate object of the present invention to provide such apparatus.

A further object of the invention is to provide shutter synchronized triggering apparatus for high speed photographic light units which does not restrict or interfere with the employment and movement of the light units in any manner. The photographic light units are not interconnected, except to common alternating current supply conductors, whereby the same may be moved and positioned as is desired.

A further object of the invention is to provide triggering apparatus for high speed photographic light units which utilizes the common alternating current supply conductors to which all the light units are connected as a means for conducting or transmitting the triggering signal. As will be hereinafter more fully explained, the apparatus of the present invention comprises a transmitter associated with the shutter of the camera and a receiver associated with each of the light units. The output of the transmitter is sent over the common supply conductors to the receivers and, when the transmitter is properly actuated in response to the opening of the camera shutter, the receivers are operative to simultaneously trigger the individual light units.

Yet another object of the invention is to provide triggering apparatus for high speed photographic light units which is extremely stable and is uneffected by variations of the supply source, etc.

Still another object of the invention is to provide apparatus of the character described which is extremely rugged and is adapted to withstand the rigours of sustained and continuous operation. Transistors are employed throughout the apparatus and this not only provides rugged assemblies but also greatly reduces the maintenance required.

A further object of the invention is to provide a highly simplified transmitter and a highly simplified receiver for the intended use which are characterized by their stability, reliability, and low cost of manufacture and assembly.

Yet a further object of the invention is to provide shutter synchronized triggering apparatus for high speed photographic light units which is adapted to be employed with light units now in use without extensive modification of the same. The transmitter and the receiver are so designed that each is a component sub-assembly adapted to be connected with and plugged into standard prior art photographic equipment.

The above, as well as other objects and advantages of the present invention will become more readily apparent upon consideration of the following specification and accompanying drawing wherein there is disclosed a preferred embodiment of the invention.

The drawing, composed of FIGURES 1A and 1B, is a schematic circuit diagram of shutter synchronized triggering apparatus for high speed photographic units constructed in accordance with the teachings of the present invention.

Referring now to the drawing, the reference numeral 10 designates a conventional camera which is provided with shutter contacts 11 and 12 so that when the camera is actuated to expose a negative the shutter contacts 11 and 12 will immediately close. Disposed about the subject being photographed are a plurality of individual high speed photographic light units which are generally designated by the reference numeral 13. Each of the light units comprises a flash tube 14 of a type well known in the art and adapted to produce a high intensity of illumination for a very short period of time and a power supply to be hereinafter more fully described.

As set forth above, it is necessary to synchronously trigger the plurality of light units simultaneously with the closure of the shutter contacts 11 and 12. To accomplish this I provide a transmitter generally designated by the reference numeral 15 which is connected with and keyed by the closure of the shutter contacts 11 and 12. Associated with each of the light units 13 is a receiver 16 that receives a signal from the transmitter 15 to trigger the flash tube 14. As will be hereinafter more fully explained, the signal from the transmitter 15 is conducted over a pair of alternating current supply conductors 17 and 18 which not only power the transmitter 15 and the various receivers 16 but also provide a source of electrical energy for the power supplies of the light units. The supply conductors 17 and 18 are, of course, connected to a source of alternating potential and may comprise the usual electrical wiring found in any photographic studio.

Considering first the construction and organization of the high speed photographic light units 13, it will be observed that each of the light units is provided with a plug-in type receptacle 19 which is inserted in a suitable terminal box 20. The terminal box 20 is connected across the supply conductors 17 and 18 by the conductors 21 and 22 whereby an alternating potential appears across the conductors 23 and 24 leading from the plug-in type of receptacle 19. The conductors 23 and 24 are connected through a switch 25 and a fuse 26 to the primary of a supply transformer 27. Connected across a portion of the primary winding of the supply transformer 27 is a modeling lamp 28. The modeling lamp 28 is provided so that the photographer can obtain an accurate idea of the lighting affects that can be obtained upon alternate positioning of the light unit. A switch 29' is connected in series with the modeling lamp 28 so that the operator can turn this lamp on and off as is desired. Also connected across the primary winding of the supply transformer 27 is a current limiting resistor 29 and a neon lamp 30. The neon lamp 30 is energized when the switch 25 is closed to indicate that the power supply of the light unit is connected to the supply source.

The output terminals of the secondary winding of the supply transformer 27 are connected by the conductors 31 and 32 directly to the input terminals of a full wave rectifier assembly 33. The output terminals of the full wave rectifier assembly 33 are connected to the conductors 34 and 35 and it will be noted that the disposition of the individual rectifiers in the full wave rectifier assembly is such that, in essence, a direct current source is connected across the conductors 34 and 35 and that the conductor 34 is positive with respect to the conductor 35.

The flash tube 14 has its anode and cathode connected by conductors 36 and 37, respectively, across the conductors 34 and 35. Also connected across the conductors 34 and 35 is a power capacitor 38 which is adapted to apply firing potential across the anode and cathode of the flash tube 14. The power capacitor 38 is charged from the full wave rectifier assembly 33 with the upper terminal thereof assuming a positive potential with respect to the lower terminal as is shown in the drawing.

The flash tube 14 is provided with a trigger electrode 39 and the arrangement is such that unless and until a triggering potential is supplied to the trigger electrode 39 the flash tube 14 will not conduct. Thus, the flash tube 14 is normally non-conductive and the power capacitor 38 is normally fully charged. When a suitable triggering potential is supplied to the trigger electrode 39 the flash tube 14 will conduct with the discharge of the power capacitor 38 to provide a source of very high intensity illumination for a very short period of time.

The trigger electrode 39 of the flash tube 14 is connected to one terminal of the secondary of a triggering transformer 40 while the other terminal of the secondary of the triggering transformer is connected to the conductor 34 via the conductors 42 and 41. The primary winding of a triggering transformer 40 is connected across the supply conductors 34 and 35 by circuit which includes the conductor 41, a triggering capacitor 43 and a resistor 45 in such a manner that the triggering capacitor 43 is normally charged with the right hand terminal thereof positive with respect to the left hand terminal thereof as is indicated in the drawing. A discharge circuit for the triggering capacitor 43 is provided which comprises, in addition to the conductor 41 and primary of the triggering transformer 40, the anode-cathode circuit of a triggering electronic unidirectional discharge device 44. The discharge device 44 is preferably a thyratron and has its anode connected by means of the conductor 49 to the conductor 34 while its cathode is grounded and interconnected with the left hand and negative terminal of the triggering capacitor 43. The discharge device 44 has a grid control element which is connected to conductor 46 and the discharge device 44 is normally maintained nonconductive unless and until a positive control potential is applied between the grid control element and the cathode thereof to swing the grid control element positive with respect to the cathode. It will be noted that the conductors 34, 35 and 46 terminate in a plug-in type of receptacle 47 which is adapted to be inserted in a suitable socket 48 of the receiver 16. It is the function of the receiver 16 to supply a positive control voltage between the conductors 46 and 35 in response to closure of the shutter contacts 11 and 12 of the camera.

In operation, the power condenser 38 is charged from the direct current source 34—35 while the flash tube 14 is normally nonconductive. The direct current source 34—35 also charges the triggering capacitor 43 at the same time through the primary of the triggering transformer 40 and the resistor 45. At any time after the capacitors 38 and 43 have been charged the camera may be actuated to close the shutter contacts 11 and 12 whereby the receiver 16 applies a positive control potential between the conductors 46 and 35 and to the grid control element 39 to condition the discharge device 44 for conduction. The discharge device 44 immediately fires and the triggering condenser 43 discharges through this discharge device and the primary of the triggering transformer 40. The resulting high voltage surge through the secondary winding of the triggering transformer 40 is applied to the trigger electrode 39 of the flash tube 14. This causes the gas in the flash tube 14 to ionize, permitting the power condenser 38 to discharge through the flash tube 14 to thereby produce a very brilliant flash of short duration. When the power condenser 38 is fully discharged the flash tube 14 promptly extinguishes and the cycle is ready for repetition.

Referring now to FIGURE 1A of the drawing, the transmitter 15 is shown to comprise a transistor 50 whose emitter 51 is connected through a parallel RC biasing circut composed of resistor 52 and capacitor 53 to a conductor 54 while the collector 55 thereof is connected to a conductor 56 by means of a parallel tuned L-C circuit composed of the capacitor 57 and the secondary winding of a feedback transformer 58. The base 59 of the transistor 50 is connected at a point between the resistors 60 and 61 which are connected across the conductors 56 and 54. The secondary of the feedback transformer 58 is connected in series with a pair of capacitors 62 and 63 and this series circuit is interconnected with the base 59 of the transistor 50 to provide the requisite feedback. Also, it will be noted that the secondary winding of the feedback transformer 58 is connected by the conductors 64 and 65 to the shutter contacts 11 and 12 of the camera.

It will thus be seen that the transistor 50 is connected to operate as an oscillator and that upon proper tuning of the L-C network 57—58 stable oscillations of a desired frequency will be produced. However, it will also be noted, that when the shutter contacts 11 and 12 are closed in response to actuation of the camera that the secondary winding of the feedback transformer 58 is effectively short circuited to interrupt the feedback signal to the transistor 50 whereby the oscillations are interrupted for a period equal to the length of time that the shutter contacts 11 and 12 remain closed. By way of illustration, but in no way intended to limit the present invention, the L-C circuit 57 and 58 may be tuned to a point where oscillations of a frequency of 100 kilocycles are evidenced across the output of the transistor 50.

The oscillations generated by the oscillator are interconnected by a coupling capacitor 66 to an amplifier which includes a transistor 67. The base 68 of the transistor 67 is connected intermediate the resistors 69 and 70 that are connected across the conductors 54 and 56 and is also interconnected with a coupling capacitor 66. The emitter 71 of the transistor 67 is connected with the conductor 54 through a parallel RC biasing circuit including resistor 72 and capacitor 73 while the collector 74 of the transistor 67 is connected to the conductor 56 through the primary winding of an output transformer 75. The transistor 67 operates as an amplifier to amplify the oscillations produced by the transistor 50. The amplified oscillations appear across the secondary terminals of the output transformer 75 and these output terminals are connected to the conductors 77 and 78. The conductor 77 interconnects with the conductor 56 while the conductor 78 connects with the conductor 79. These last mentioned conductors (56 and 79) terminate in a plug-in type of receptacle 80 which is inserted in a socket 81 that is connected across the common supply conductors 17 and 18. It will thus be seen that when the shutter contacts 11 and 12 are open continuous oscillations will be produced and amplified and sent out over the supply conductors 17 and 18. However, when the shutter contacts 11 and 12 are closed the feedback circuit for the transistor 50 will be effectively short circuited and no signal will be sent out over the supply conductors 17 and 18 as long as these shutter contacts remain closed.

For the proper orientation of the transmitter it is, of course, necessary to supply power to the oscillator and amplifier circuits and the transistors 50 and 67 associated therewith. This is accomplished in the present instance by a rectifier 82 and a parallel RC circuit composed of capacitor 83 and resistor 84. The rectifier 82 is connected in the conductor 56 while the capacitor 83 and resistor 84 are connected across the conductors 56 and 54. It will be noted that the conductor 54 is interconnected with the conductor 79 and that the conductor 79 and 56 are electrically connected across the supply conductors 17 and 18. Thus, a source of alternating current potential is applied between the conductors 56 and 54. The rectifier 82 and the capacitor 83 are connected in such a manner that the alternating current is rectified to provide a direct current potential across the conductors 56 and 54 with the conductor 54 being at a positive potential with respect to the conductor 56. The arrangement is such that the transmitter is powered from the supply conductor 17 and 18 and yet the transmitter is operative to send out a signal over these same supply conductors.

A switch 85 is interposed in the conductor 56 to allow the transmitter 16 to be disconnected from the supply conductor 17 and 18 without removing the plug-in type receptacle 80. Also, as is conventional, a current limiting resistor 86 and a neon lamp 87 are connected in the transmitter to indicate when the same is connected with the supply conductor 17 and 18.

Each of the receivers 16 comprises a tuned transformer 90 whose input terminals terminate in a plug-in type of receptacle 91 which is inserted in the socket 20. It will thus be seen that the secondary of the tuned coupling transformer 90 is effectively connected across the supply conductors 17 and 18. This transformer is selectively tuned to receive only the signal generated by the transmitter 15 and sent out over the conductors 17 and 18. Therefore, if oscillations of 100 kilocycles are generated by the oscillator circuit including the transistor 50 the transformer 90 is so tuned that only 100 kilocycle signals appear across the secondary winding thereof.

One terminal of the secondary winding of the tuned transformer 90 is connected by conductor 91 to the base of a transistor 92. The emitter of the transistor 92 is connected through a parallel RC biasing circuit composed of capacitor 93 and resistor 94 and a resistor 95 to a conductor 96 while the collector of this transistor is connected directly to the emitter of a transistor 97. A collector of the transistor 97 is connected to a conductor 98 while the base thereof is connected intermediate a pair of resistors 99 and 100 which are connected across the transistors 92 and 97. The transistors 92 and 97 define, in essence, an emitter follower whereby any change in the input to the transistor 92 will effect a proportional change in the transistor 97. Connected in parallel across the resistors 99 and 100 is a filter capacitor 101 for the use of which will be hereinafter more fully apparent.

The upper terminal of the resistor 100 and the upper terminal of the filter capacitor 101 are connected to a conductor 102. The conductors 96, 102, and 98 terminate in the socket 48 which is adapted to receive the plug-in type of receptacle 47. Therefore, the conductor 96 is at the same potential as the conductor 34 while the conductor 98 is at the same potential as the conductor 35. Also, the conductor 102 is directly connected to and at the same potential as the conductor 46.

When the tuned coupling transformer 90 is receiving signals within its tuned range the transistors 92 and 97 are both saturated whereby a circuit is completed between the conductors 96 and 98. This circuit includes the resistor 95, RC circuit 93—94 and the transistors 92 and 97. Since the internal emitter to collector resistance of each of the transistors 92 and 97 is quite small no appreciable voltage drop is evidenced across the resistors 100 and 99. Thus, the conductor 102 and consequently the conductor 46 are approximately at the same voltage potential as the conductors 98 and 35 whereby the discharge device 44 is maintained non-conductive.

When the shutter contacts 11 and 12 of the camera are closed the oscillations of the transistor 50 are interrupted and no signal is sent out over the supply conductors 17 and 18. No signal is therefore evidenced across the secondary winding of the selectively tuned coupling transformer 90 and no saturating signal is supplied to the transistors 92 and 97. Since the transistors 92 and 97 are no longer saturated a new circuit is completed between the conductors 96 and 98. This circuit includes the resistor 95, the RC circuit 93—94 and the resistors 100 and 99. The resistors 100 and 99 are such a value that an appreciable voltage drop is now evidenced thereacross and the conductors 102 and 46 are now at a positive potential with respect to the conductors 98 and 35. Thus, a positive control potential is placed on the grid control element of the discharge device 44 which drives this grid control element positive with respect to the cathode to initiate conduction in the discharge device. When the thyratron fires the discharge of the capacitor 43 triggers the flash tube 14 to produce the desired illumination as described above.

It is preferred that transmitter 15, the receivers 16 and the high speed photographic light units 13 be constructed as individual sub-assemblies as is indicated by the broken lines in the drawing and be provided with suitable plug-in type receptacles and sockets as shown. This allows the transmitter and receivers to be employed with light units already in use and offers flexibility in the employment of the apparatus. Of course, in the average photographic studio more than one photographic light unit will be employed and a receiver would be associated with each of the photographic light units in the manner depicted in FIGURE 1B. Only one transmitter would be used since each of the receivers would be interconnected with the common alternating current supply conductors 17 and 18.

The triggering apparatus of the present invention allows the photographic light units to be easily moved and positioned since the only conductors involved are those interconnecting the transmitter, receivers and light units to the common alternating current supply conductors 17 and 18. The photographer does not need to worry about blocking the line of sight between the photographic light units as is the case when photoelectric cells are employed in accordance with prior art teachings.

One particular aspect of the apparatus disclosed above is its stability and ruggedness. The emitter-follower comprising the transistors 92 and 97 and the pair of resistances 99 and 100 are provided to insure that a positive control potential of sufficient magnitude is always impressed on the grid control element of the discharge device 44 to condition the same for conduction when the transmitted signals are interrupted. Also, the transistors 92 and 97 are normally operated at such a point that they are not effected nor will the discharge device 44 be rendered conductive due to variations and fluctuations of the source of alternating current.

The transmitter and receiver employed in the apparatus of the present invention are characterized by their extreme simplicity in design and manufacture and the use of transistors provides rugged apparatus. Another important feature of the apparatus is that the transmitter and receiver derive their power directly from the common alternating current supply conductors over which the signals are transmitted. This eliminates the need of providing expensive and bulky separate power supplies, etc.

Although I have accomplished the objects initially set forth, it should be apparent that many changes may be made in the disclosed embodiment of the invention without departing from the clear teachings thereof. Accordingly, reference should be had to the following appended claims in determining the true scope and intent of the invention.

I claim:

1. Apparatus for synchronizing the discharge of a plurality of flash photographic lamp units with camera shutter actuation in a photographic studio and the like having interconnected power wiring for supplying energizing electrical current to said lamp units individually, which comprises a signal generator of predetermined high frequency adapted to be electrically connected with said wiring to obtain electrical energy for powering said generator and to also provide an output circuit for the signals generated, said generator having control means adapted to be connected to the shutter of the camera to abruptly change the output of the generator upon opening of the camera shutter, a signal receiver adapted to be associated with each of said lamp units and to be electrically connected with said wiring and thus be electrically powered therefrom and to receive therefrom the signals created by said generator, each of said receivers having means to detect the abrupt change in the strength of said signals, and each of said receivers having means controlled by said means to detect to initiate discharge of its associated lamp unit.

2. Apparatus according to claim 1 further characterized in that said signal generator comprises a pair of conductors adapted to be connected with said power wiring and to which is connected in series a series circuit of a rectifier and an oscillator circuit including an electric valve, said control means comprising a circuit interconnecting said oscillator circuit and a switch on the camera shutter and being operative when said shutter is opened to interrupt operation of said oscillator circuit, and means to couple the output of said oscillator circuit to said conductors.

3. Apparatus according to claim 2 further characterized in that said oscillator circuit comprises in series a tank circuit of inductance and capacitance in parallel and the collector and emitter of a transistor, said interconnecting circuit being operative when said shutter is opened to short out said inductance.

4. Apparatus according to claim 1 further characterized in that each of said lamp units comprises a flash lamp, a power capacitor for energizing said flash lamp, and a charging circuit for said capacitor comprising a rectifier and a transformer connected with the power wiring, said signal receiver comprising a tuned transformer having its primary connected to said power wiring in parallel with the interconnection between the power wiring and said first mentioned transformer, and means responsive to the output of said tuned transformer to initiate discharge of said power capacitor through said flash lamp.

5. Apparatus according to claim 4 further characterized in that said means to initiate discharge comprises a trigger electrode on said flash lamp, a second capacitor, and a grid-controlled electric discharge device for discharging the energy of said second capacitor through said trigger electrode; said means to detect comprising said tuned transformer, and means responsive to the output of said transformer to abruptly change the bias on the control grid of said electric discharge device to initiate conduction therein upon the appearance of an abrupt change in the strength of the high frequency signals impressed on said power wiring.

References Cited in the file of this patent

UNITED STATES PATENTS

| | | |
|---|---|---|
| 2,188,508 | Herdman | Jan. 30, 1940 |
| 2,358,796 | Edgerton | Sept. 26, 1944 |
| 2,408,764 | Edgerton | Oct. 8, 1946 |
| 2,419,978 | Wildman | May 6, 1947 |